US010620831B2

(12) United States Patent
Blaum et al.

(10) Patent No.: US 10,620,831 B2
(45) Date of Patent: Apr. 14, 2020

(54) HIGH PERFORMANCE OPTICAL STORAGE SYSTEM FOR PROTECTION AGAINST CONCURRENT DATA LOSS

(71) Applicant: International Business Machines Corporation, Armonk, NY (US)

(72) Inventors: Mario Blaum, San Jose, CA (US); Steven R. Hetzler, Los Altos, CA (US); Wayne C. Hineman, San Jose, CA (US); Robert M. Rees, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 57 days.

(21) Appl. No.: 15/940,471

(22) Filed: Mar. 29, 2018

(65) Prior Publication Data
US 2018/0225045 A1    Aug. 9, 2018

Related U.S. Application Data

(63) Continuation of application No. 15/048,043, filed on Feb. 19, 2016, now Pat. No. 10,001,922.

(51) Int. Cl.
*G06F 3/06* (2006.01)
*G06F 12/127* (2016.01)
(Continued)

(52) U.S. Cl.
CPC ............ *G06F 3/0604* (2013.01); *G06F 3/067* (2013.01); *G06F 3/0619* (2013.01);
(Continued)

(58) Field of Classification Search
CPC .... G06F 3/0604; G06F 3/0619; G06F 3/0637; G06F 3/0655; G06F 3/067; G06F 3/062; G06F 3/065; G06F 3/0652; G06F 3/0686; G06F 3/0683; G06F 3/0689; G06F 3/0685; G06F 2003/0691; G06F 2003/0692; G06F 2212/211; G06F 12/0866; G06F 12/0292;
(Continued)

(56) References Cited

U.S. PATENT DOCUMENTS 6,148,368 A    11/2000   Dekoning
6,851,010 B1    2/2005   Rao et al.
(Continued)

OTHER PUBLICATIONS

Mell, P., et al., "The NIST Definition of Cloud Computing", National Institute of Standards and Technology Special Publication 800-145, Sep. 2011, pp. 1-7, U.S. Department of Commerce, United States.

(Continued)

*Primary Examiner* — Tracy A Warren
(74) *Attorney, Agent, or Firm* — Sherman IP LLP; Kenneth L. Sherman; Steven Laut (57) ABSTRACT

A controller including an object aggregator process that combines multiple data objects into a data segment, and transfers the data segment with reduced location metadata to storage media of at least one of multiple storage units. An erasure coder process generates code to encode the data segment into an erasure code that protects against concurrent data loss in the multiple storage units based on data reconstruction using a first responder, a second responder and a last responder.

20 Claims, 9 Drawing Sheets

(51) Int. Cl.
*G06F 12/02* (2006.01)
*G06F 12/06* (2006.01)
*G06F 12/0891* (2016.01)
*G06F 12/121* (2016.01)

(52) U.S. Cl.
CPC .......... G06F 3/0638 (2013.01); G06F 3/0655 (2013.01); G06F 3/0656 (2013.01); *G06F 3/062* (2013.01); *G06F 3/065* (2013.01); *G06F 3/0652* (2013.01); *G06F 3/0686* (2013.01); *G06F 12/0246* (2013.01); *G06F 12/0638* (2013.01); *G06F 12/0891* (2013.01); *G06F 12/121* (2013.01); *G06F 12/127* (2013.01)

(58) Field of Classification Search
CPC ............. G06F 13/1668; G06F 13/1673; G06F 11/1004; G06F 11/1012; G06F 11/1048; G06F 11/1076; G06F 11/08
See application file for complete search history.

(56) References Cited

U.S. PATENT DOCUMENTS

| | | | |
|---|---|---|---|
| 7,073,115 | B2 | 7/2006 | English et al. |
| 7,080,278 | B1 | 7/2006 | Kleiman et al. |
| 7,930,475 | B1 | 4/2011 | Kleiman et al. |
| 7,930,611 | B2 | 4/2011 | Huang et al. |
| 2002/0169934 | A1 | 11/2002 | Krapp et al. |
| 2008/0250195 | A1 | 10/2008 | Chow et al. |
| 2010/0042832 | A1 | 2/2010 | Fujibayashi et al. |
| 2010/0082607 | A1 | 4/2010 | Punera et al. |
| 2011/0264818 | A1 | 10/2011 | Riggert et al. |
| 2012/0079189 | A1* | 3/2012 | Colgrove .............. G06F 3/0605 711/114 |
| 2012/0166910 | A1* | 6/2012 | Baek ................... G06F 11/1044 714/758 |
| 2012/0239868 | A1 | 9/2012 | Ryan et al. |
| 2013/0031308 | A1 | 1/2013 | De Spiegeleer et al. |
| 2013/0332685 | A1 | 12/2013 | Kripalani et al. |
| 2014/0229514 | A1 | 6/2014 | Shazly |
| 2014/0280871 | A1 | 9/2014 | Brown |
| 2014/0325133 | A1 | 10/2014 | Gaspard et al. |
| 2014/0337684 | A1 | 11/2014 | Resch et al. |
| 2016/0109875 | A1 | 4/2016 | Majewski et al. |
| 2016/0139980 | A1* | 5/2016 | Cowling .............. G06F 11/1048 714/763 |
| 2016/0380650 | A1* | 12/2016 | Calder ................ G06F 11/1076 714/766 |

OTHER PUBLICATIONS

List of IBM Patents or Applications Treated as Related, Filed Feb. 19, 2018, U.S. Appl. No. 15/048,043.

* cited by examiner

| D0000 |
| CRC |
| D0001 |
| CRC |
| ... |
| CRC |
| D00fe |
| CRC |
| D00ff |
| CRC |

HIGH PERFORMANCE OPTICAL STORAGE SYSTEM FOR PROTECTION AGAINST CONCURRENT DATA LOSS

BACKGROUND

Today's optical libraries have low performance, with access times of 10 s of seconds to a minute or more. While optical drives allow fast random access to data on a disc, the overall random access performance is limited by the media move time and drive initialization times. The latter limitations means that today's optical systems are largely designed for slow tier operations. Additionally, cloud environments require the library to provide high performance and high reliability at very large scales. Service level agreements need to be maintained in the face of various component failures, including concurrent loss of a storage unit, loss of a piece of media in a further storage unit and loss of a block of data from a further piece of media.

SUMMARY

Embodiments relate to a data storage structure. One embodiment includes a controller with an object aggregator process that combines multiple data objects into a data segment, and transfers the data segment with reduced location metadata to storage media of at least one of multiple storage units. An erasure coder process generates code to encode the data segment into an erasure code that protects against concurrent data loss in the multiple storage units based on data reconstruction using a first responder, a second responder and a last responder.

These and other features, aspects and advantages of the embodiments will become understood with reference to the following description, appended claims and accompanying figures.

DETAILED DESCRIPTION

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description of cloud computing, implementation of the teachings recited herein are not limited to a cloud computing environment. Rather, embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Figure 1:
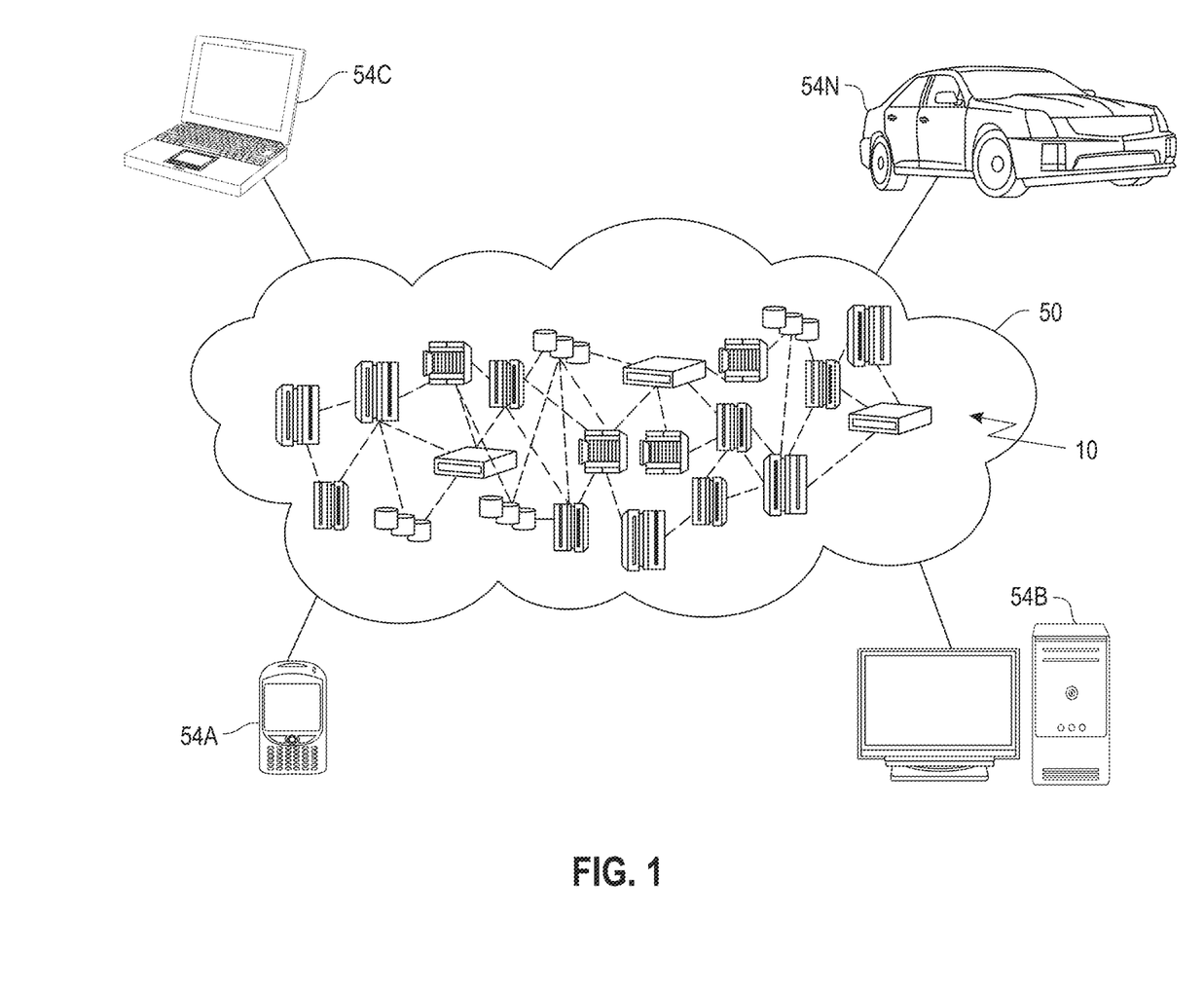
FIG. 1 depicts a cloud computing environment, according to an embodiment.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 2:
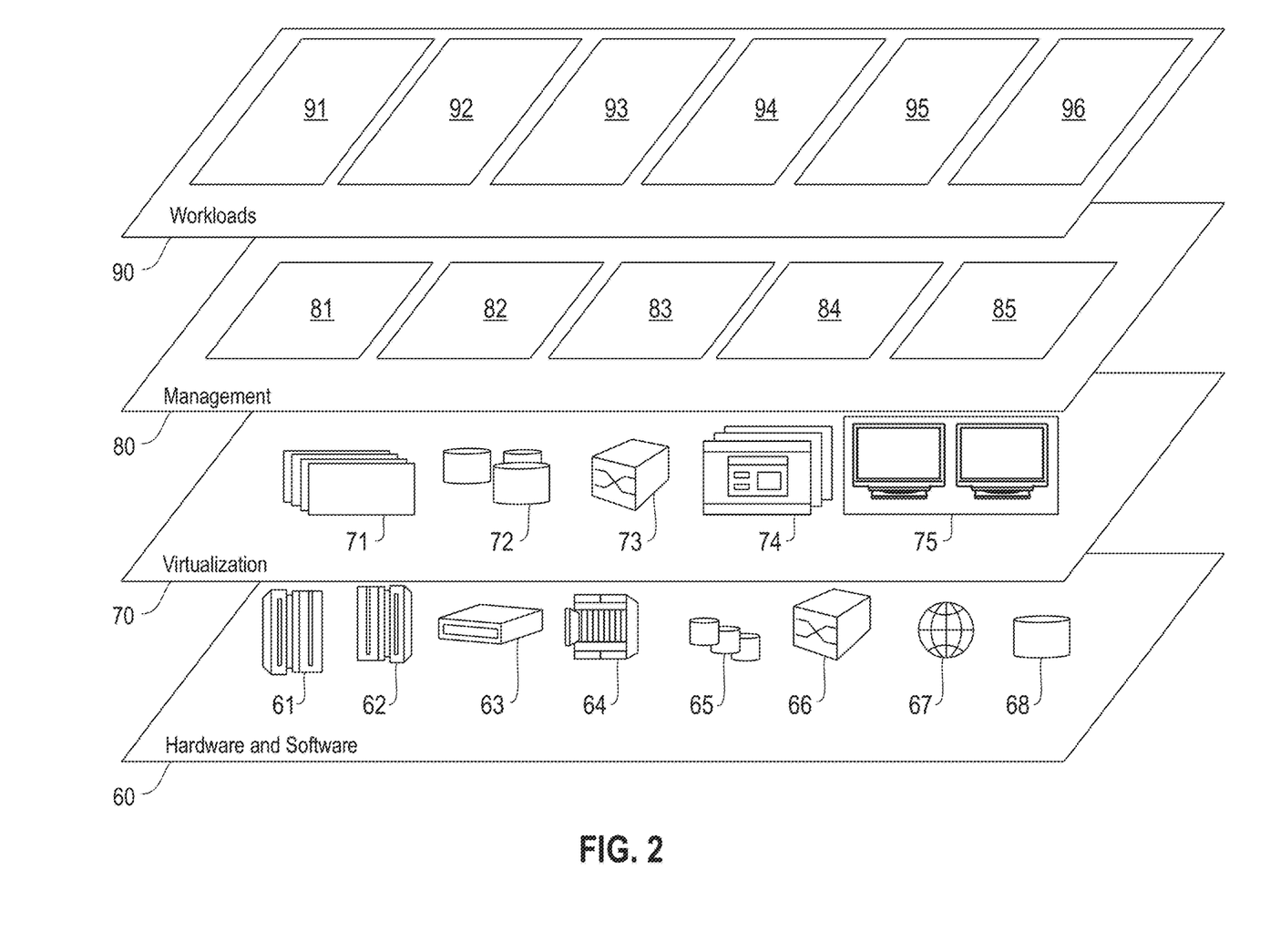
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95 and protection against concurrent data loss in multiple storage units processing 96. As mentioned above, all of the foregoing examples described with respect to FIG. 2 are illustrative only, and the embodiments are not limited to these examples.

It is understood all functions of one or more embodiments as described herein may be typically performed in the computing environment 50 (FIG. 1), the network 300 (FIG. 3), or performed by the system 400 (FIG. 4), which can be tangibly embodied as hardware processors and with modules of program code. However, this need not be the case. Rather, the functionality recited herein could be carried out/implemented and/or enabled by any of the layers 60, 70, 80 and 90 shown in FIG. 2.

It is reiterated that although this disclosure includes a detailed description on cloud computing, implementation of the teachings recited herein are not limited to a cloud computing environment. Rather, the embodiments may be implemented with any type of clustered computing environment now known or later developed.

Figure 3:
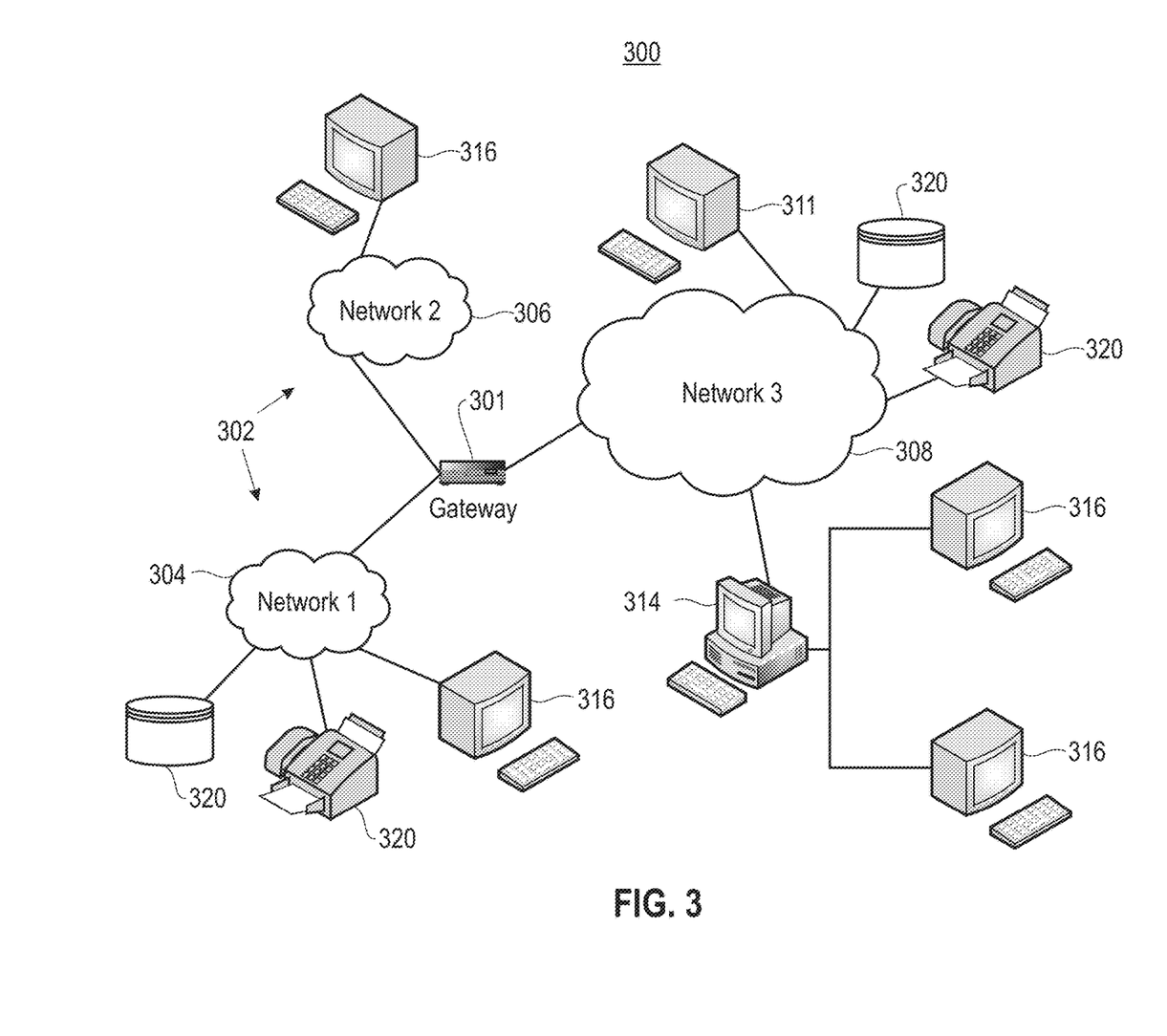
FIG. 3 is a network architecture for verifying historical artifacts in disparate source control systems, according to an embodiment.

FIG. 3 illustrates a network architecture 300, in accordance with one embodiment. As shown in FIG. 3, a plurality of remote networks 302 are provided, including a first remote network 304 and a second remote network 306. A gateway 301 may be coupled between the remote networks 302 and a proximate network 308. In the context of the present network architecture 300, the networks 304, 306 may each take any form including, but not limited to, a LAN, a WAN, such as the Internet, public switched telephone network (PSTN), internal telephone network, etc. In one embodiment, the network architecture 300 employs a POSIX® based file system.

In use, the gateway 301 serves as an entrance point from the remote networks 302 to the proximate network 308. As such, the gateway 301 may function as a router, which is capable of directing a given packet of data that arrives at the gateway 301, and a switch, which furnishes the actual path in and out of the gateway 301 for a given packet.

Further included is at least one data server 314 coupled to the proximate network 308, which is accessible from the remote networks 302 via the gateway 301. It should be noted that the data server(s) 314 may include any type of computing device/groupware. Coupled to each data server 314 is a plurality of user devices 316. Such user devices 316 may include a desktop computer, laptop computer, handheld computer, printer, and/or any other type of logic-containing device. It should be noted that a user device 311 may also be directly coupled to any of the networks in some embodiments.

A peripheral 320 or series of peripherals 320, e.g., facsimile machines, printers, scanners, hard disk drives, networked and/or local storage units or systems, etc., may be coupled to one or more of the networks 304, 306, 308. It should be noted that databases and/or additional components may be utilized with, or integrated into, any type of network element coupled to the networks 304, 306, 308. In the context of the present description, a network element may refer to any component of a network.

According to some approaches, methods and systems described herein may be implemented with and/or on virtual systems and/or systems, which emulate one or more other systems, such as a UNIX system that emulates an IBM z/OS environment, a UNIX system that virtually hosts a MICROSOFT WINDOWS environment, a MICROSOFT WINDOWS system that emulates an IBM z/OS environment, etc. This virtualization and/or emulation may be implemented through the use of VMWARE software in some embodiments.

Figure 4:
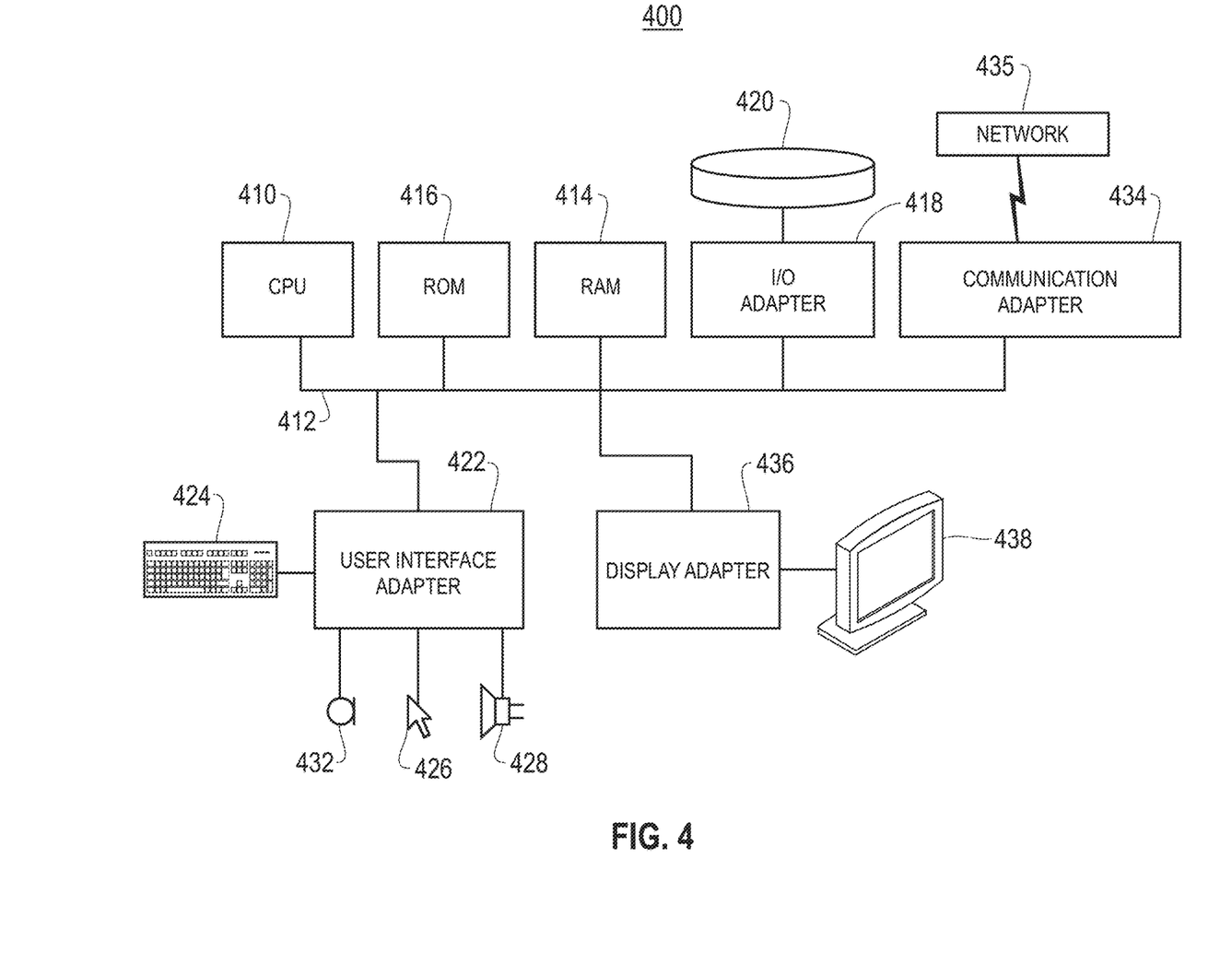
FIG. 4 shows a representative hardware environment that may be associated with the servers and/or clients of FIG. 1, according to an embodiment.

FIG. 4 shows a representative hardware system 400 environment associated with a user device 316 and/or server 314 of FIG. 3, in accordance with one embodiment. In one example, a hardware configuration includes a workstation having a central processing unit 410, such as a microprocessor, and a number of other units interconnected via a system bus 412. The workstation shown in FIG. 4 may include a Random Access Memory (RAM) 414, Read Only Memory (ROM) 416, an I/O adapter 418 for connecting peripheral devices, such as disk storage units 420 to the bus 412, a user interface adapter 422 for connecting a keyboard 424, a mouse 426, a speaker 428, a microphone 432, and/or other user interface devices, such as a touch screen, a digital camera (not shown), etc., to the bus 412, communication adapter 434 for connecting the workstation to a communication network 435 (e.g., a data processing network) and a display adapter 436 for connecting the bus 412 to a display device 438.

In one example, the workstation may have resident thereon an operating system, such as the MICROSOFT WINDOWS Operating System (OS), a MAC OS, a UNIX OS, etc. In one embodiment, the system 400 employs a POSIX® based file system. It will be appreciated that other examples may also be implemented on platforms and operating systems other than those mentioned. Such other examples may include operating systems written using JAVA, XML, C, and/or C++ language, or other programming languages, along with an object oriented programming methodology. Object oriented programming (OOP), which has become increasingly used to develop complex applications, may also be used.

Figure 5:
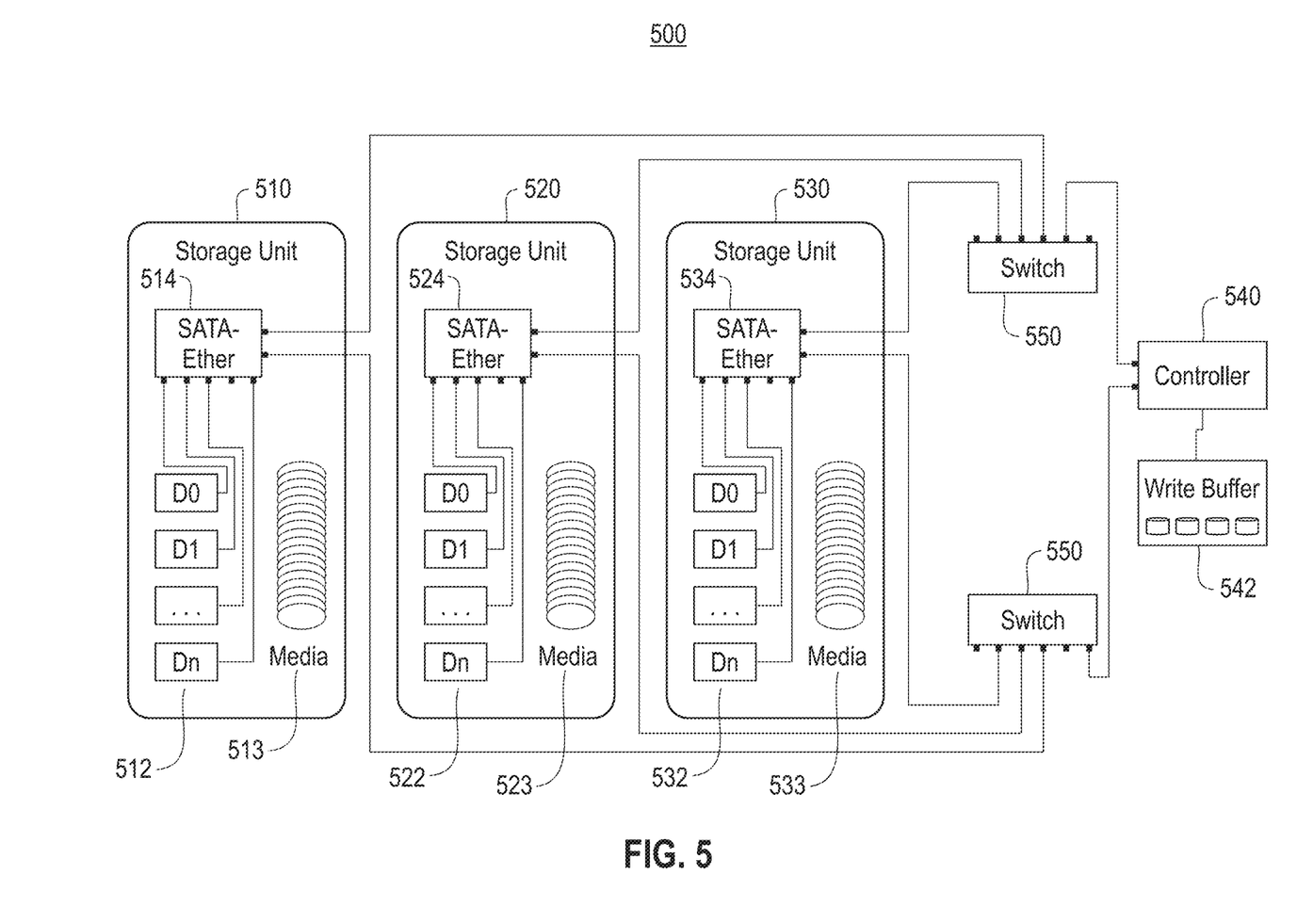
FIG. 5 shows a high performance storage system, according to one embodiment.

FIG. 5 shows a high performance storage system 500, according to one embodiment. A plurality of storage units 510, 520 and 530 are shown, each containing storage media (e.g., hard disc drives, solid state drives, optical drives, etc.) 512, 522 and 532 and a library executive 514, 524 and 534 connected to a controller 540 over a network 550. In one embodiment, the storage units 510, 520 and 530 are optical storage units which include robotics (638, 640, see FIG. 6) for transporting media (636, FIG. 6) from a rest location to a plurality of optical drives. The controller 540 includes a persistent write buffer 542 for staging (i.e., buffering) write data prior to writing to the optical media 513, 523 and 533. In a cloud environment, the controller 540 is preferably instantiated as a virtual machine or container, and the persistent write buffer 542 instantiated as fault tolerant non-volatile storage resources provided by the cloud infrastructure. The controller 540 may be moved between hardware platforms using cloud deployment resources, multiple controllers may be dynamically created as required (such as for controller fault tolerance). Further, persistent write buffer 542 space may be dynamically allocated to meet changing workload needs, such as handling changes in the data write rate, or to assist in rebuild operations, etc.

Figure 6:
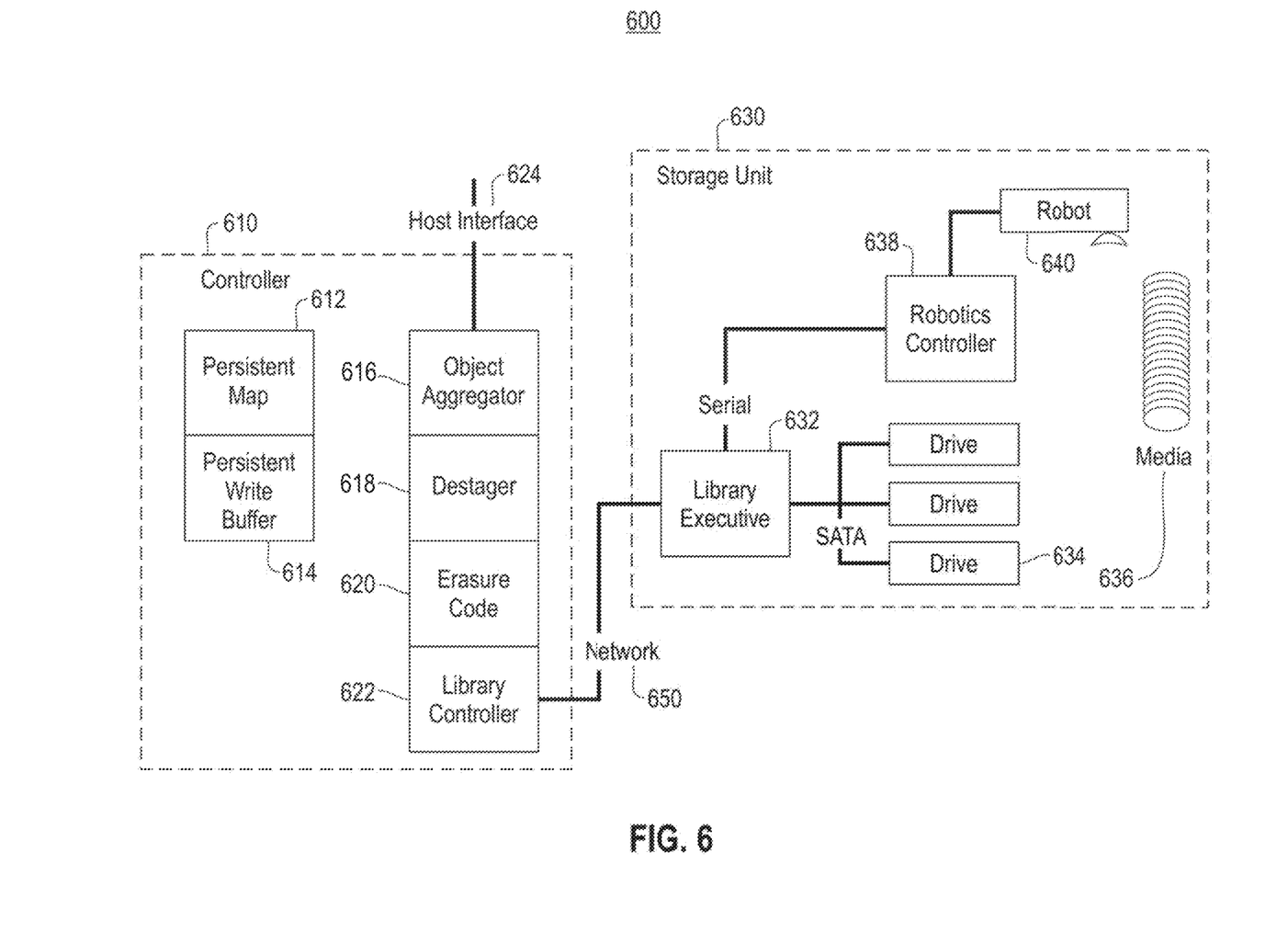
FIG. 6 shows an exemplar controller for a high performance storage system, according to one embodiment.

FIG. 6 shows an exemplar system 600 comprising a controller 610 for a high performance storage system, according to one embodiment. FIG. 6 details a general configuration of the controller 610 for the system. The controller 610 is a collection of modules comprising a Host Interface 624, an Object Aggregator 616, a Destager 618, an Erasure Coder 620, and a Library Controller 622. In the preferred embodiment, the software function is split between a soft (i.e., software based) controller 610 (also 540, see FIG. 5) and the storage unit 630. This arrangement improves the scalability of the system, allows for low-level control of storage unit functions to be encapsulated in the storage unit 630. In one embodiment, the controller 610 is deployed on a conventional host computer, either as native installed code, or as a virtual machine image or container, etc. As shown in FIG. 6, a single controller 610 may connect to a plurality of storage units (510, 520 and 530, see FIG. 5) over the network 650.

In one embodiment, applications connect to the Host Interface 624 using an object-based protocol. An example of an object-based protocol is HTTP; other front-end protocols and gateways are possible (jclouds, etc). Objects are varying length data items with unique names chosen by the application. The notion of object is applied generally, including objects stored in an object store, files in a network-attached file system, and block ranges in a network-attached block-based system. In this embodiment, objects are typically small in size (e.g., <100 KiB); however, objects can be of an arbitrary size. The Host Interface 624 supports operations such as GET, PUT, DELETE, and QUERY while other specialized operations (COPY, MOVE, etc.) are possible.

The Object Aggregator 616 combines large numbers of small objects into large cache lines known as segments. In an embodiment, a typical size of a segment is 256 MiB. The aggregation process enables large amounts of data to be transferred to permanent storage with a minimum amount of location metadata, using the full bandwidth of the backend storage library (510, 520 and 530, see FIG. 5). The segments are composed in the Persistent Write Buffer 614, which serves as a non-volatile staging area in which a number of segments can be accumulated prior to de-staging to the Storage Unit 630. In one embodiment, the Persistent Write Buffer 614 is provisioned to be approximately five to ten percent (5-10%) of the total system storage capacity. The Persistent Write Buffer 614 is protected by an erasure code: for example, one or more hard disk drives with RAID-6. However, any non-volatile storage medium, and any erasure code of sufficient reliability, can be used.

The size of the Persistent Write Buffer 614 may be dynamic. It may be increased in size when required, such as during rebuild operations, garbage collection or to handle heavy write loads. Once the write workload declines, the size of the Persistent Write Buffer 614 may be reduced. This may be achieved in a cloud-like environment by allocating and deallocating space. The associated metadata is handled according to the method used to describe it. For example, if the Persistent Write Buffer 614 is managed as a file system, then the file system may be expanded or reduced as part of the dynamic sizing. Alternately, given the complexity of shrinking file systems, it may be preferable to use multiple instances of file systems for the Persistent Write Buffer 614, such that a new file system is created when space is expanded, and then removed when space is reduced. A dynamic Persistent Write Buffer 614 can reduce the operating costs of the system, which will be driven by the average buffer size required as opposed to the maximum buffer size required.

As part of the aggregation process the Object Aggregator 616 can apply transformations to the data for integrity (message digests), for storage efficiency (compression), and for privacy and security (encryption). The Object Aggregator 616 maintains a Persistent Map 612 of the location of objects within segments. The location information is used to retrieve data for application GET operations. Typical examples of the Persistent Map 612 implementation include key-value stores and relational databases. In one embodiment, the Object Aggregator 616 also encodes objects in a self-describing format within the segments. Self-description enables the Persistent Map 612 to be reconstructed by reading the segments stored on optical media 636 directly, should the Persistent Map 612 be lost and/or unreachable.

The Destager 618 drives the process of transferring the data segments that have been accumulated in the Persistent Write Buffer 614 to locations on media 636 in the Storage Unit 630. In one embodiment, the Destager 618 makes the data segments available to the Erasure Coder 620 in a sequential fashion, using multiple data streams, so that only a single read pass over the segments is required. After successfully de-staging a segment, the Destager 618 uses the Persistent Map 612 to track the location of the segment in permanent storage 634, 636.

The Erasure Coder 620 encodes the data segments into an erasure code, such as a first responder code. A first responder code is preferred since it enables low-latency recovery with a minimum number of optical volume mounts. When a media failure is detected, by, for example, the drive ECC, checksum, etc., the Erasure Coder 620 performs data reconstruction using a tiered model. The first tier response, known as First Responder, allows a sector failure to be repaired using a single optical disc 636, thereby incurring no additional media mounts. For broader errors, smaller groups of optical discs use regional parity, known as Second Responder, to repair errors using small numbers of disc mounts. Row parity can be used to recover more extensive media errors, including complete loss of a piece of media. Such recovery involves reading from all the discs in a row. Finally, for more extensive errors, global parity blocks provide a Last Responder mode whereby all of the discs in an erasure code group can be mounted to repair a significant error. All of the responder reconstruction operations are performed while the optical storage system is in service to applications.

In one embodiment, the Library Controller 622 and Library Executive 632 form a client-server pair that supports low-level I/O operations from the main controller 610 to the Storage Unit 630. A typical connection between the controller 610 and Storage Unit 630 is implemented as Ethernet with a TCP/IP overlay. The Library Controller 622 is part of the main controller; it brokers I/O operations between the Erasure Coder 620 and the Storage Unit 630. The Library Executive 632 is a software module that runs on the internal processor of the Storage Unit 630 and manages the Robotics Controller 638, which loads and unloads optical discs 636 into drives 634, which read and write data. The protocol between the Library Controller 622 and Library Executive 632 implements the primary control and I/O operations required by the Erasure Coder: load a disc into a drive, write data to a disc, read data from a disc, and unload a disc from a drive. In the preferred embodiment, the protocol allows First Responder parity blocks to be directly computed, and local reconstruction to occur, by the Library Executive 632 within the Storage Unit 630, thereby offloading these processes from the main controller 610.

Figure 7:
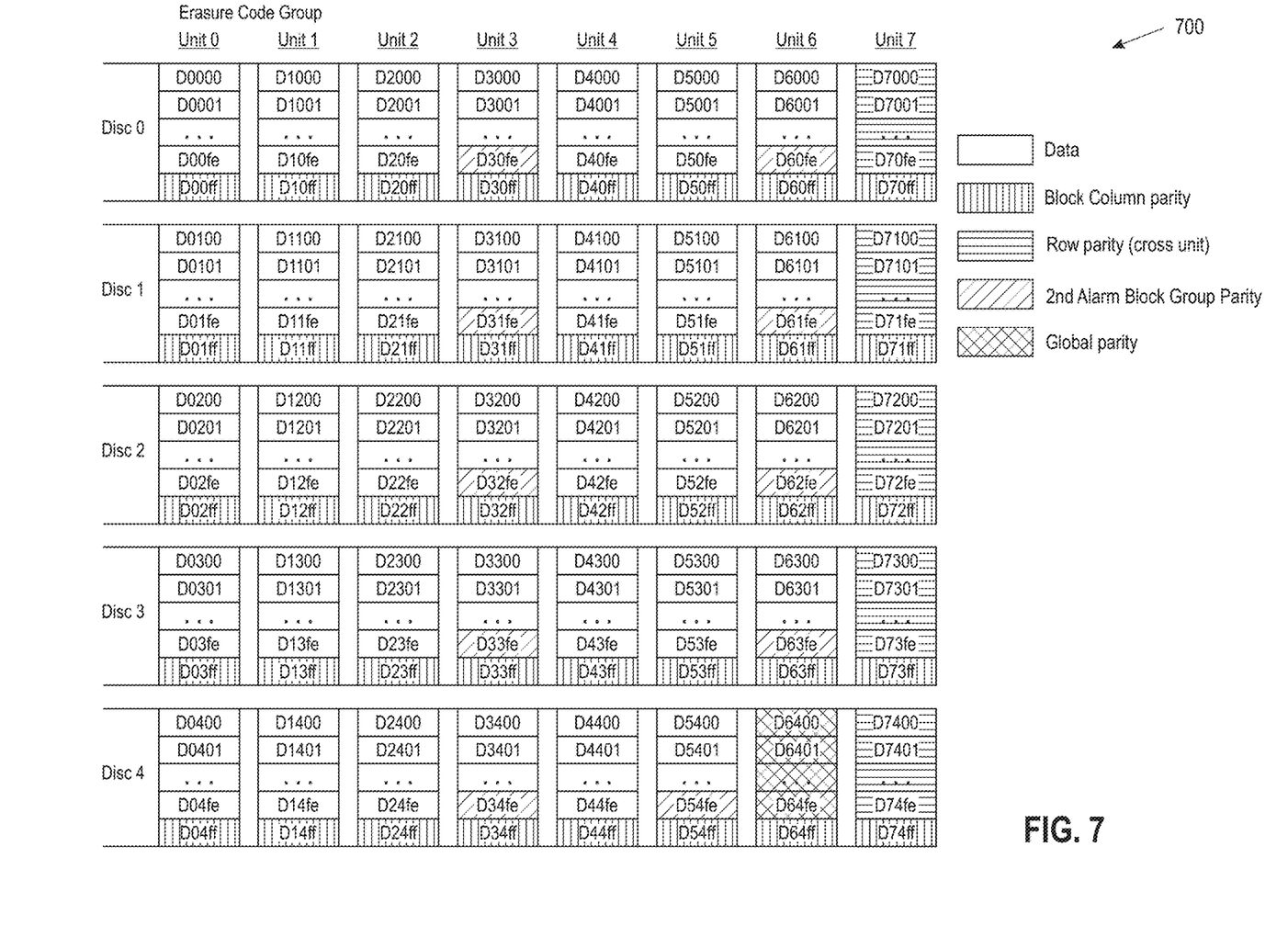
FIG. 7 shows an exemplar erasure code layout for a high performance storage system, according to an embodiment.

FIG. 7 shows an exemplar erasure code layout 700 for a high performance storage system, according to an embodiment. An important aspect of the system is achieving a fast response time in the presence of failures. Failures can take many forms, including loss of an ECC block on the media, loss of piece of media (e.g., stuck in a failed drive), loss of a storage unit (e.g., maintenance). It is beneficial for the system to recover quickly from the most common failures, yet still be able to return data in the presence of more significant failures. A first responder erasure code provides these features. FIG. 7 shows the data layout 700 for an example system using a first responder erasure code. In this example, there are five tables labeled "Disc 0" through "Disc 4," each representing a region of data on a disc 513, 523 and 533 from each of the storage units 510, 520 and 530 (see FIG. 5). Each column in FIG. 7 represents a separate storage unit (510, 520 and 530, FIG. 5), identified as "Unit 0" through "Unit 7." Spreading the erasure code across multiple storage units allows the code to be robust to loss of a storage unit (510, see FIG. 5), such as for maintenance.

In this example, the erasure code group uses five (5) discs from each unit ("Disc 0"-"Disc 4"), with each data entry being a block on the associated disc. In this embodiment, a block is typically the unit of ECC on optical media, typically 64 kBytes, which is the minimum unit of data lost when the media ECC is unable to recover data. In this embodiment, 256 blocks are used from each disc (labeled Dudxx, where "u" is the unit number, "d" is the disc number in the code group and "xx" is the media block number in hexadecimal). While the blocks shown in FIG. 7 are shown as contiguous, this is not required.

There are four (4) classes of parities in this embodiment: 1) block column parity; 2) row parity; 3) block group parity; and 4) global parity. In FIG. 7, entries Dudff are first responder column parities; they provide protection from the loss of a block in the associated column. Thus, a single media block loss may be recovered by reading the column data on a disc, without need to mount further discs. This speeds the recovery operation for this class of error. In this embodiment, the first responder erasure code has the property that the Dudff entries are computed as parities of the block in their associated columns. This is true for each column parity, including for example D64ff and D74ff. This configuration allows the column parity computation to be offloaded to the storage units (510, 520 and 530, FIG. 5) if desired, thereby improving the scalability of the system. In the recovery scenario, single block loss may be reconstructed within the storage unit without invoking recovery at the controller (610, see FIG. 6) layer. In the offload scenario, some of the functions shown in Erasure coder 620 (FIG. 6) are performed within the Library Executive 632 (FIG. 6).

As shown in FIG. 7, entries D3dfe, D6dfe (where d is not equal to 4) and D54fe provide second alarm protection to a second media block loss in a set of four columns. Particularly, D33fe protects a second media block loss in Disc 3 on Units 0, 1, 2 and 3 (first 4 columns of Disc 3). In one embodiment, the layout for the $2^{nd}$ set of 4 columns differs from the first set, and differs for Disc 4. An asymmetric layout places the $2^{nd}$ alarm parity in the first entry following the last data entry in the column set. Locating the parity after all the associated data allows the parity to be computed incrementally, thus removing the requirement for having all the associated data available in the write buffer when computing the $2^{nd}$ responder parity.

Entries labeled D7dxx may be thought of as row parties; they can be used when the number of media blocks lost in a column exceeds the capabilities of the first and second responder codes, or when an entire piece of media is lost, or when an entire storage unit is lost or unavailable. Entries labeled D64xx are global parities and can be used to correct a further loss beyond what the first responder, second responder and row parities can correct. For example, the row parities may be used to correct the loss of a storage unit, and the global parity can be used to correct a simultaneous disc loss. Such power is useful since it allows a first storage unit to go offline, such as for maintenance, while a disc loss is being recovered in a second unit. Since there are likely a large number (>500) of discs in a storage unit, there will be a large number of erasure code groups (>50). Since there are 40 discs in a code group, the probability of having a disc loss start prior to or during a unit maintenance event is high enough to warrant having global parity protection. Thus, all the data in the storage system remains available even during these events.

In one embodiment, the number of discs 636 in a storage unit 630 in the erasure code is smaller than the number of drives 634 in the storage unit 630 (see FIG. 6). This configuration provides performance advantages during reconstruction while providing for deferred maintenance on the optical drives. That is, an optical drive 634 may be offline in a given storage unit 630, yet all the discs 636 in a code group in that storage unit 630 may be simultaneously mounted in the remaining drives 634 (see FIG. 6). Note that FIG. 7 shows a single erasure code group, however, code groups may be spread across the disc in the units with different mappings, such as using parity rotation or declustering.

In one embodiment, a high write throughput is provided without requiring an entire erasure code group to be buffered prior to writing to the media. In an optical based storage unit 630 using robotic 638, 640 (FIG. 6) retrieval of media 636, the exchange time for a piece of media 636 can be a number of seconds (see FIG. 6). Write throughput may be increased by ensuring the amount of data written results in a duration that is long compared to the media exchange time. For example, if a single optical drive 634 has a write rate of 18 MB/s, and has 64 kB blocks, then the time to write one group worth of blocks on a disc 636 (256 blocks) would be 16 MB/18 MB/s=0.8 s. If the media exchange time is 10 s, then achieving 90% throughput would require 90 s of write time, which would be 1.6 GB of data. Thus, in this example it is beneficial to write about 1.6 GB of data to a given disc prior to exchanging it with another disc. Therefore, it is beneficial for the writing to proceed starting with the blocks in a code group for a given disc to blocks on the same disc from further erasure code groups. This process continues until the desired write throughput is achieved. Using the current example, this would require about 112 groups to achieve 1.6 GB of write data for a given disc. The buffer requirements for achieving 90 s of write time can be diminished by ensuring that each parity entry is placed in the layout such that it depends only on information received prior to the time the parity entry is written. The asymmetric layout of FIG. 7 ensures this is the case. For a given code group, it is necessary to buffer the parity entries during their incremental computation. Thus, the buffer overhead for parity entries in this example is 1,580 entries (255*5+255+2*5+8*5), out of 10,240 total entries.

It is also beneficial to include integrity checks along with the stored information given the possibility for optical drives to return incorrect data, such as a microcode error. Further, there may be unprotected buffers (e.g., without ECC) in the data path, such as in the storage unit 630 and the optical drive 634 (See FIG. 6). While the system described here may provide high level integrity checking, such as at the object level, providing integrity checks at the erasure code level allows data errors to be converted to erasures, which can then be corrected by the erasure code where possible. If data errors cannot be corrected, they are reported as erasures, which are preferred to returning data in error.

Figure 8:
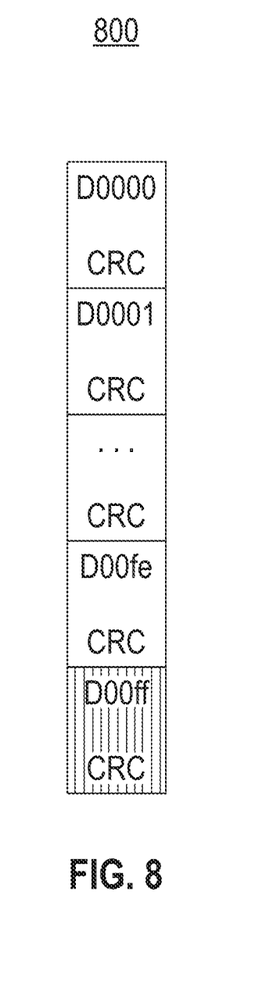
FIG. 8 shows an exemplar integrity check for a high performance storage system, according to an embodiment.

FIG. 8 shows an exemplar integrity check 800 for a high performance storage system, according to an embodiment. Integrity checks may be computed as cyclic redundancy checks (e.g., CRC32, CRC64, MD5 hash, etc.). There is a benefit to using CRC-type computations, which are linear with the erasure code. In such a case, the CRC of parity and the parity of CRC are identical. Thus, the CRCs are protected by the erasure code. Further, a CRC can be computed and stored in every entry. Looking at FIG. 8, CRC checks are shown appended to the data entries D000 through D00fe. The value of the CRC for parity entry D00ff may be computed as the CRC of D00ff, or as the parity of the CRCs from D000-D00fe, due to the linearity. Thus, the CRC of a parity entry, such as D00ff may be computed on read and compared with the stored value, further testing the integrity of the parity entry. In this embodiment, the integrity of every entry may be confirmed prior to using it. In one embodiment, an entry with a failed data integrity check may be marked as an erasure, and merely corrected by the erasure code if possible.

Figure 9:
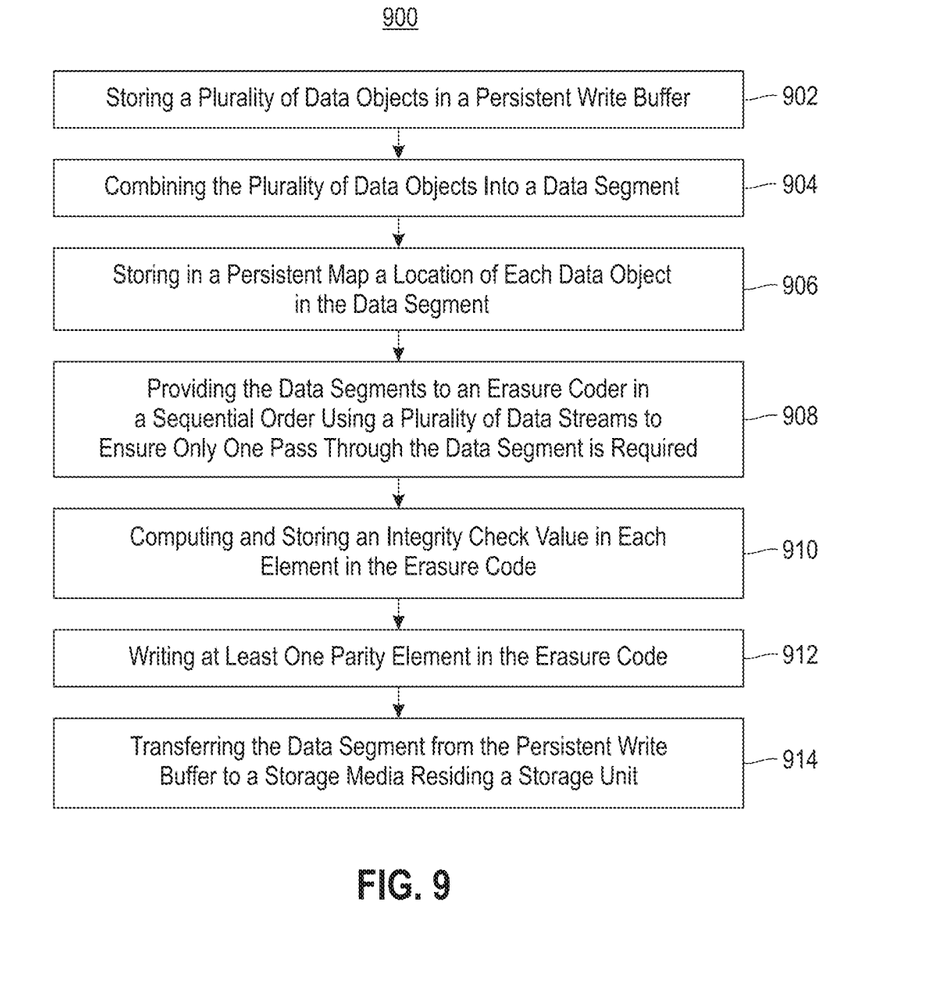
FIG. 9 illustrates a block diagram for a method for storing data in a high performance storage system, according to one embodiment.

FIG. 9 illustrates a block diagram for a method 900 storing data, according to one embodiment. The method 900 begins with block 902 with storing a plurality of data objects in a persistent write buffer. In one embodiment, a system may receive instructions from a host machine to store the data objects to long term retention. In response thereto, the system stores the data objects in the persistent write buffer before final data-protected storage. After storing the plurality of data objects in a persistent write buffer, the method 900 continues with block 904, combining the plurality of data objects into a data segment. The method 900 continues with block 906 with storing in a persistent map a location of each data object in the data segment. In one embodiment, the data segments are self-describing in nature so a persistent map of where the data objects reside in a given data segment can be reconstructed by reading the segment itself.

Upon completion of block 906, the method 900 continues with block 908, providing the data segment to an erasure coder in a sequential order. In one embodiment, providing is performed by using a plurality of data streams. Providing 908 is designed such that the erasure coder will only need to read/pass through the data segment one time in order to create an erasure code. Upon completion of block 908, the method 900 continues with block 910 and 912 which collectively are encoding the data segment into an erasure code. The encoding begins with block 910, computing and storing an integrity check value in each element in the erasure code. Integrity check values may be computed as, for example, a cyclic redundancy check (e.g., CRC32, CRC64, MD5 hash, etc.). In this embodiment, the CRC of parity and the parity of CRC are identical, thus, the CRCs are protected by the erasure code. Upon completion of block 910, the method 900 continues with block 912, writing at least one parity element in the erasure code. In one embodiment, the parity element depends only on at least one prior written element in the erasure code. After block 912, the method 900 continues with block 914, transferring the data segment from the persistent write buffer to a storage media residing in a storage unit.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments are described below with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles of the embodiments and the practical application, and to enable others of ordinary skill in the art to understand the various embodiments with various modifications as are suited to the particular use contemplated.

What is claimed is:

1. A system comprising:
 a memory that stores instructions; and
 a processor that executes the instructions to:
  combine a plurality of data objects into a data segment including location metadata, and transfers the data segment with the location metadata to storage media of at least one storage unit of a plurality of storage units; and
  generate code to encode the data segment into an erasure code that protects against concurrent data loss in the plurality of storage units based on data reconstruction using a first responder process, a second responder process and a last responder process, wherein column parity blocks for the first responder process are directly computed within the at least one storage unit of the plurality of storage units.

2. The system of claim 1, wherein the first responder process provides data reconstruction for a sector failure in a single storage media of the plurality of storage units using column parity, and the second responder process provides data reconstruction for media errors in a group of storage media of the plurality of storage units based on using row parity and reading from the group of storage media in a row.

3. The system of claim 2, wherein the last responder process provides data reconstruction for media errors in all storage media in an erasure code group of the plurality of storage units using global parity.

4. The system of claim 1, further comprising:
 a persistent map configured to maintain a map of location of each of the plurality of data objects in the data segment;
 wherein local data reconstruction by the first responder process is performed within the at least one storage unit of the plurality of storage units.

5. The system of claim 1, wherein the erasure code comprises block column parity elements, row parity elements, block group parity elements and global parity elements, and column parity block computation is offloaded from a controller to the at least one storage unit of the plurality of storage units.

6. The system of claim 1, wherein the processor further executes the instructions to: perform an integrity check that is computed and stored, within each element in the erasure code.

7. The system of claim 4, wherein the processor further executes the instructions to: encode data objects in the data segment such that the map is reconstructed by reading segments stored in the storage media.

8. The system of claim 1, wherein the erasure code is stored across a plurality of media storage devices in the plurality of storage units.

9. A method, comprising:
 combining a plurality of data objects into a data segment including location metadata;
 transferring the data segment with the location metadata to storage media of at least one storage unit of a plurality of storage units; and
 generating code to encode the data segment into an erasure code that protects against concurrent data loss in the plurality of storage units based on data reconstruction using a first responder process, a second responder process and a last responder process, wherein column parity blocks for the first responder process are directly computed within the at least one storage unit of the plurality of storage units.

10. The method of claim 9, wherein the first responder process provides data reconstruction for a sector failure in a single storage media of the plurality of storage units using column parity, and the second responder process provides data reconstruction for media errors in a group of storage media of the plurality of storage units based on using row parity and reading from the group of storage media in a row.

11. The method of claim 10, wherein the last responder process provides data reconstruction for media errors in all storage media in an erasure code group of the plurality of storage units using global parity.

12. The method of claim 9, further comprising:
 maintaining a map of location of each of the plurality of data objects in the data segment;
 wherein local data reconstruction by the first responder process is performed within the at least one storage unit of the plurality of storage units.

13. The method of claim 9, wherein the erasure code comprises block column parity elements, row parity elements, block group parity elements and global parity elements, and column parity block computation is offloaded from a controller to the at least one storage unit of the plurality of storage units.

14. The method of claim 9, further comprising:
storing an integrity check within each element in the erasure code.

15. The method of claim 12, further comprising:
encoding data objects in the data segment such that the map is reconstructed by reading segments stored in the storage media;
wherein the erasure code is stored across a plurality of media storage devices in the plurality of storage units.

16. A computer program product for protecting against concurrent data loss in a plurality of storage units, the computer program product comprising a computer readable storage device having program instructions embodied therewith, the program instructions executable by a processor to cause the processor to:
combine, by the processor, a plurality of data objects into a data segment including location metadata;
transfer, by the processor, the data segment with the location metadata to storage media of at least one of a plurality of storage units; and
generate, by the processor, code to encode the data segment into an erasure code that protects against concurrent data loss in the plurality of storage units based on data reconstruction using a first responder process, a second responder process and a last responder process, wherein column parity blocks for the first responder process are directly computed within the at least one storage unit of the plurality of storage units.

17. The computer program product of claim 16, wherein:
the first responder process provides data reconstruction for a sector failure in a single storage media of the plurality of storage units using column parity;
the second responder process provides data reconstruction for media errors in a group of storage media of the plurality of storage units based on using row parity and reading from the group of storage media in a row; and
the last responder process provides data reconstruction for media errors in all storage media in an erasure code group of the plurality of storage units using global parity.

18. The computer program product of claim 16, wherein the program instructions executable by the processor further cause the processor to:
maintain, by the processor, a map of location of each of the plurality of data objects in the data segment;
wherein local data reconstruction by the first responder process is performed within the at least one storage unit of the plurality of storage units.

19. The computer program product of claim 16, wherein the erasure code comprises block column parity elements, row parity elements, block group parity elements and global parity elements, and column parity block computation is offloaded from a controller to the at least one storage unit of the plurality of storage units.

20. The computer program product of claim 16, wherein the program instructions executable by the processor further cause the processor to:
store, by the processor, an integrity check within each element in the erasure code; and
encode, by the processor, data objects in the data segment such that the map is reconstructed by reading segments stored in the storage media;
wherein the erasure code is stored across a plurality of media storage devices in the plurality of storage units.

* * * * *